United States Patent
Dobmeier et al.

(10) Patent No.: US 6,390,452 B1
(45) Date of Patent: May 21, 2002

(54) SAFETY LATCH FOR A TIRE CARRIER AND IMPROVEMENTS THEREFOR

(75) Inventors: Ludwig P. Dobmeier; Jeffrey Greaves, both of Windsor (CA)

(73) Assignee: TKA Fabco Corp. (CA)

( * ) Notice: Subject to any disclaimer, the term of this patent is extended or adjusted under 35 U.S.C. 154(b) by 0 days.

(21) Appl. No.: 07/956,999

(22) Filed: Oct. 6, 1992

Related U.S. Application Data

(63) Continuation-in-part of application No. 07/639,542, filed on Jan. 10, 1991, now Pat. No. 5,188,341.

(51) Int. Cl.[7] .................................................. B66D 1/00
(52) U.S. Cl. ........................ 254/323; 254/270; 254/276; 414/463
(58) Field of Search ................................. 254/323, 903, 254/269, 270, 276; 414/463, 466; 224/42.23; 187/73

(56) References Cited

U.S. PATENT DOCUMENTS

| | | | |
|---|---|---|---|
| 1,993,744 A | 3/1935 | Morison | 254/169 |
| 2,019,512 A | 11/1935 | Stahl | 254/173 |
| 2,791,754 A | 5/1957 | Collard | 333/83 |
| 3,494,595 A | 2/1970 | Bohan | 254/150 |
| 3,731,545 A | 5/1973 | Beezer | 74/24 |
| 3,856,167 A | 12/1974 | Yasue et al. | 214/451 |
| 3,874,536 A | 4/1975 | Watanabe | 214/451 |
| 3,986,588 A | 10/1976 | Kuzarov | 192/16 |
| 4,059,197 A | 11/1977 | Iida | 214/451 |
| 4,249,682 A | 2/1981 | Yasuc et al. | 224/42.23 |
| 4,325,470 A | 4/1982 | Bopp | 192/16 |
| 4,544,136 A | 10/1985 | Denman et al. | 254/323 |
| 4,625,947 A | 12/1986 | Denman et al. | 254/323 |
| 4,693,453 A | 9/1987 | Ivan | 254/323 |
| 4,884,785 A | 12/1989 | Denman et al. | 254/389 |
| 4,927,340 A | 5/1990 | McCullough | 418/55 |
| 4,997,164 A | 3/1991 | Kito et al. | 254/323 |
| 5,100,106 A | 3/1992 | Denman et al. | 254/323 |
| 5,188,341 A * | 2/1993 | Greaves | 254/323 |
| RE34,413 E | 10/1993 | McCullough | 418/55.3 |
| 5,251,877 A | 10/1993 | Rempinski et al. | 254/323 |

FOREIGN PATENT DOCUMENTS

| | | | |
|---|---|---|---|
| DE | 313223 | 10/1952 | |
| EP | 0 491 513 A1 | 6/1992 | B62D/43/04 |
| FR | 2 335 753 | 12/1976 | F16H/25/08 |
| GB | 2111635 | 12/1982 | |

* cited by examiner

Primary Examiner—Katherine A. Matecki
(74) Attorney, Agent, or Firm—Harness, Dickey & Pierce, P.L.C.

(57) ABSTRACT

This invention provides a safety mechanism for a winch assembly when storing a load, such as a tire under a vehicle or a boat on a trailer, in a raised or stored position. The invention finds particular application to a spare tire, but those skilled in the art will appreciate the broader benefits of such a structure when used with a winch assembly for other uses such as a boat winch for a trailer or any analogous use wherein it is desirable to secure a load in the raised or stored position.

A unique actuator is described with an improvement of the invention, which includes a control path therewith to control a rod end and thereby actuates in a preferred embodiment a latch by converting rotary motion to linear motion.

13 Claims, 10 Drawing Sheets

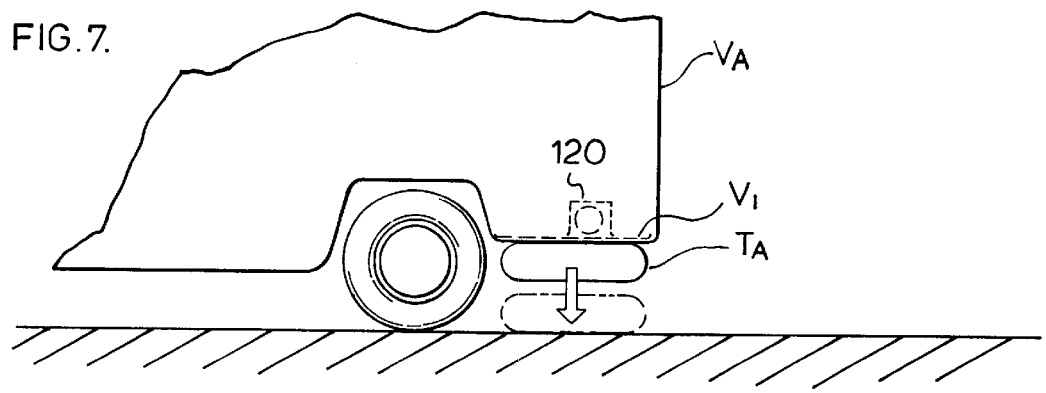
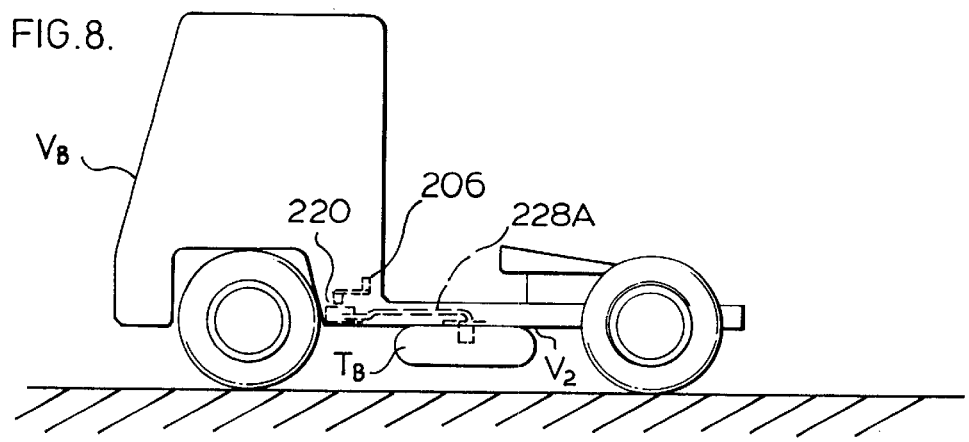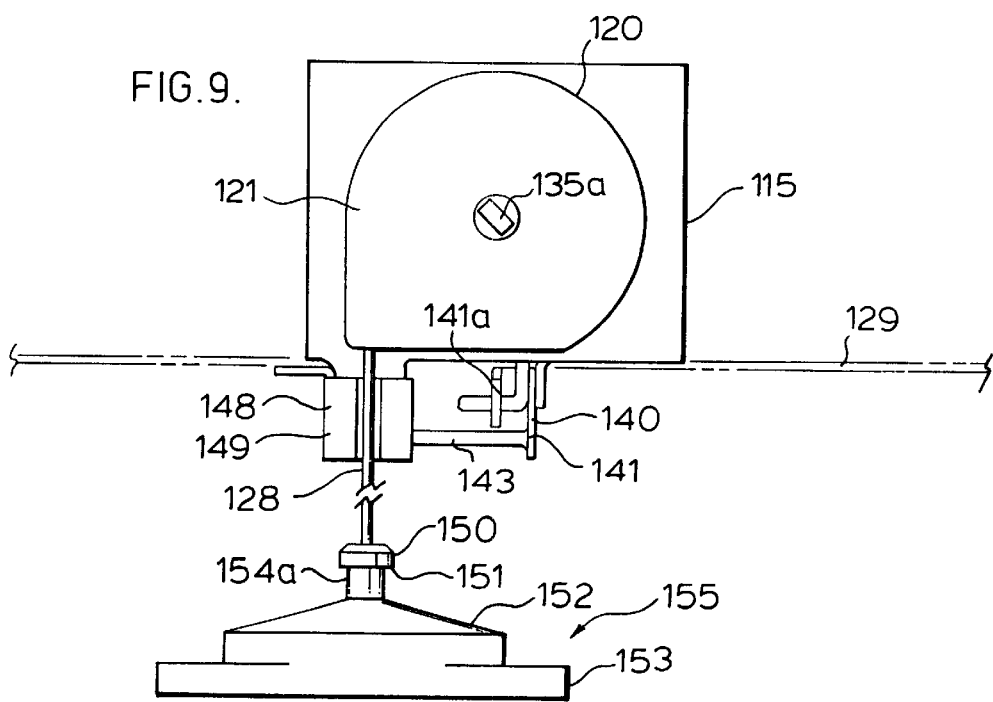

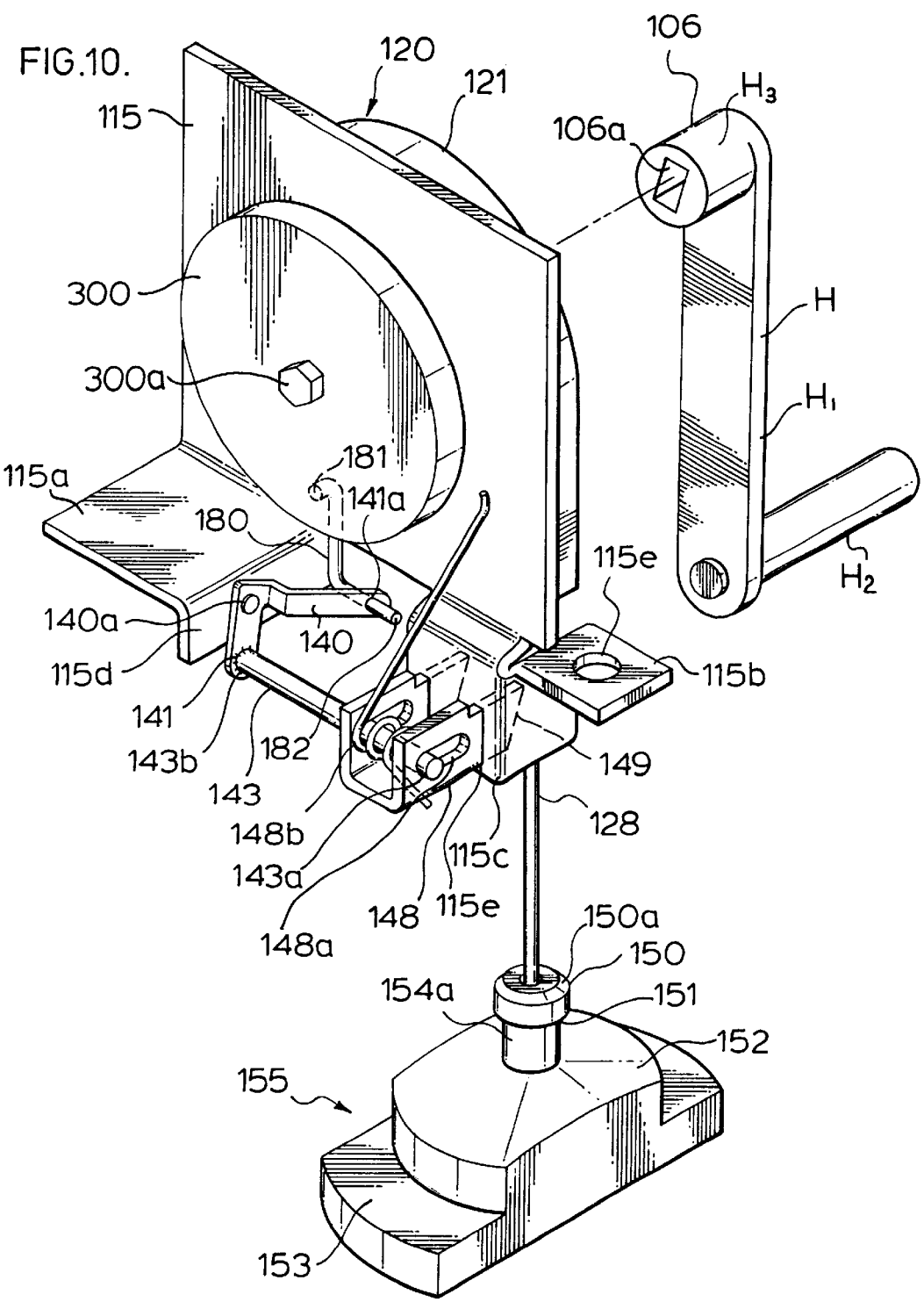

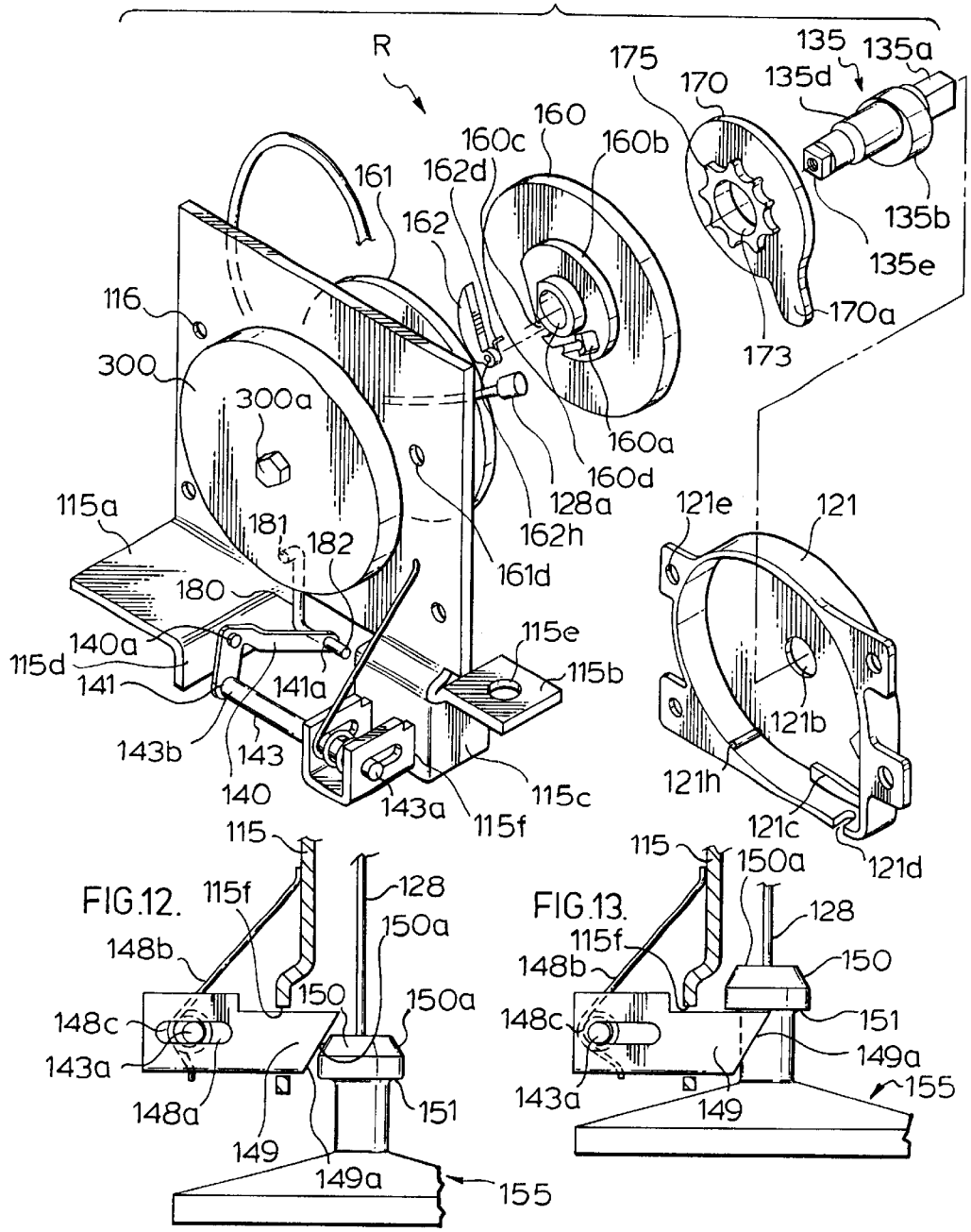

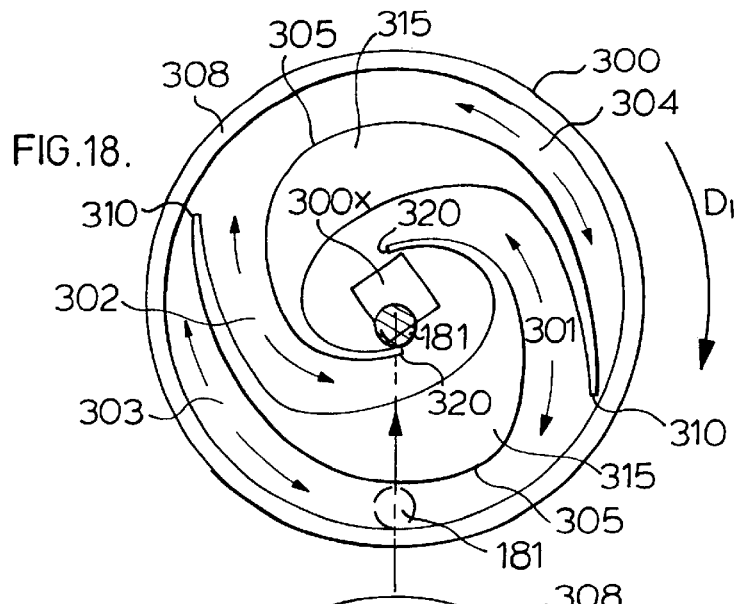
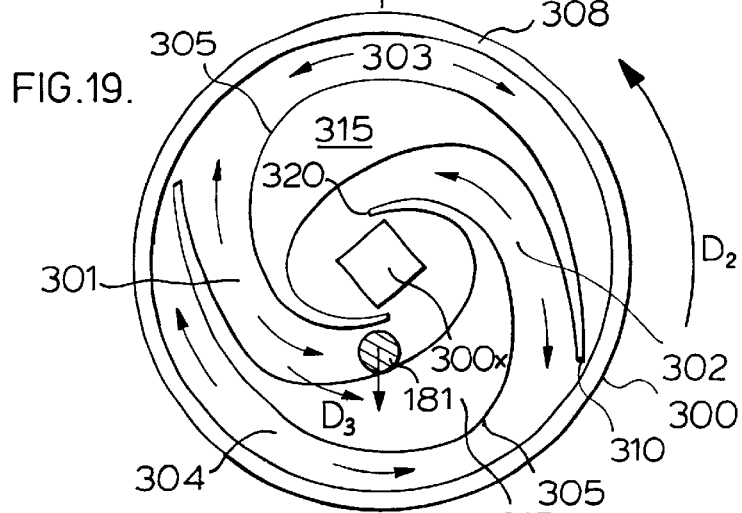
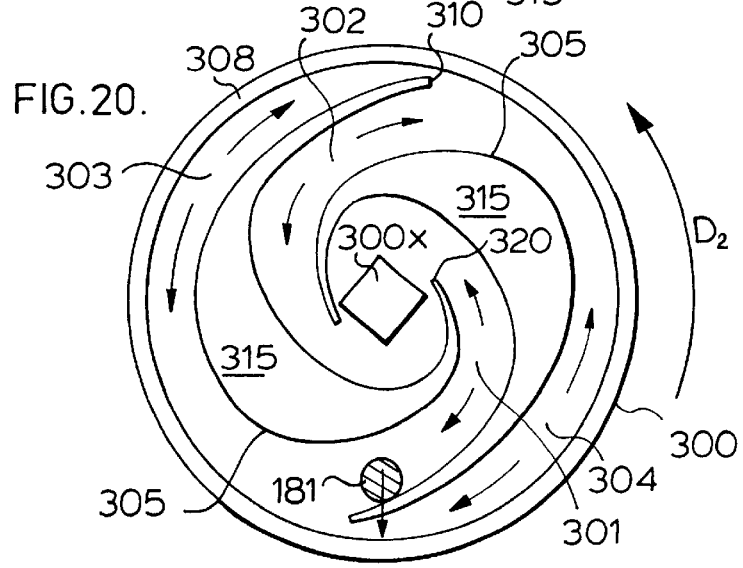

SAFETY LATCH FOR A TIRE CARRIER AND IMPROVEMENTS THEREFOR

This is a continuation in part of U.S. patent application Ser. No. 07/639,542, filed on Jan. 10, 1991, now U.S. Pat. No. 5,188,341.

FIELD OF INVENTION

This invention relates to safety devices which maintain a load in a retained position. More specifically this invention finds application for tires which are stored under a vehicle, having been raised to that position by a tire winch, which includes letting out and reeling in a resilient member such as a cable to move the tire from a lowered position to a stored position. A safety device is therefor provided, which ensures the tire remains in the stored position should the resilient member break. This application also relates to a rotary actuator which in a preferred embodiment is embodied with the winch.

BACKGROUND OF THE INVENTION

A great number of devices exists which raise and lower a load, and specifically a spare tire from a stored position underneath a vehicle to a lowered position for access by an individual. Conventionally the tire carrier may be pinned to the frame by nut and bolt or the like to retain the tire in a raised position, should a resilient member break.

U.S. Pat. No. 3,856,167 to Kabushiki Kaisha, describes an improved holding device for a spare tire which includes a tire carrier portion suspended from a chain so that a tire is retained in a stored position and is locked in position. The release of the lock is actuated by the rotation of the shaft 9 which causes the disengagement of the lever from the groove of the wheel support member. Therefore rotation of the operating shaft in the appropriate direction is what is required to raise and lower the spare wheel. Further the assembly of the aforementioned device is quite heavy and cumbersome in operation as best seen in FIGS. 3, 4, 9 and 10 thereof. The '167 patent, provides a pawl or spring steel spring 19 which prevents the rotation of the ratchet wheel, as seen in FIGS. 2, 6(a, b), and 7, wherein member 19 forcibly engages the peripheral edge of the ratchet wheel 5 and prevents the rotation of the wheel in the direction which causes release of the chain.

It would therefore be advantageous in one aspect of the invention to provided a positive locking of the wheel in position which is not dependent upon the rotation of the shaft, and the mechanical reliability of all of the interrelated components, which are required for such a mechanism to work. It would also be advantages to simplify the '167 structure considerably so as to provide a simple device which upon rotation of the winch handle releases the locking device in a positive manner.

U.S. Pat. No. 4,884,785 to Deuer Manufacturing describes a securing mechanism for a spare tire which is normally disengaged from the carrier of the tire when the tire is in the raised position. Should the cable break locking pins are urged to engage the tire carrier and hold it in a raised position so the tire is not lost. This mechanism includes locking pins which are urged outwardly by springs. Should salt spray over a number of years degrade the quality of response of these pins, it is possible that the device may fail just when it is most needed.

Nowhere within the prior art is there found a simple latching device which is actuated when a cranking device engages a detent portion proximate the winch. In one aspect of the invention no rotation of the shaft is required and the latch is always released prior to rotation of the shaft thereby reducing the load on the latch and simplifying the operation of the mechanism. When the cranking device is disengaged from the detent portion, the latch being resilient biased moves back to its latching position. In another aspect of an improvement of the invention the latch may be release upon rotation of the cranking device using a member which releases the latch upon rotation of the cranking mechanism in a much simplified manner than presently known devices.

It is therefore an object of this invention to provided a safety device for a load carrier which is engaged at all times when the carrier is in the raised position.

It is a further object this invention to provide a safety device for a load carrier which is easy to use and is reliable.

It is a further object of an improvement to the invention to provide a rotary actuator which controls an operating device for a remote mechanism and which operation of the actuator device moves the operating mechanism and preferably the actuator being embodied with a winch mechanism as an add on component thereof or as integral part thereof Further and other objects of this invention will become apparent to a man skilled in the art when considering the following summary of the invention and the more detailed description of the preferred embodiments illustrated herein.

SUMMARY OF THE INVENTION

This invention provides a safety mechanism for a winch assembly when storing a load, such as a tire under a vehicle or a boat on a trailer, in a raised or stored position. The invention finds particular application to a spare tire, but those skilled in the art will appreciate the broader benefits of such a structure when used with a winch assembly for other uses such as a boat winch for a trailer or any analogous use wherein it is desirable to secure a load in the raised or stored position.

According to one aspect of the invention there is provided a safety device for a winch assembly, preferably for a spare tire storage assembly, the assembly including a winch affixed by mounting means proximate a stored position for a load, for example the preferred spare tire, the winch by the operation of handle means lets out and takes up a length of a member (preferably a cable) affixed at one end to the winch and preferably to a reel thereof, which letting out and taking up of the member moves the load, for example the preferred spare tire, installed on a hub, from a locked stored position, preferably under a vehicle, to an unlocked accessible position remote and preferably below the stored position, the safety device comprising a carrier and preferably a tire carrier for carrying the load, for example the preferred spare tire installed on the hub, the carrier including a first portion and a second portion, the first portion for supporting the load, the preferred tire installed on a hub, and the second portion being integral with the first portion and affixed with the other end of the member remote the winch, the second portion of the carrier including a detent portion, (preferably a shoulder), the safety device having engaging means for said handle means, the engaging means for said handle means being affixed with the mounting means proximate the winch and having a preferably hollow portion, the preferably hollow portion of the engaging means having lever means associated therewith, the lever means being moveably affixed with respect to the mounting means, the safety device having resiliently biased latching means moveably affixed with respect to the mounting means, the lever means being interconnected with the latching means and being moveable from a first position when the handle means does not engage the engaging means to a second position whereat the handle means engages the engaging means, the latching means having detent means disposed therewith and moveable with the latching means by the lever means from a third position whereat the load, for example the preferred spare tire, is in the locked position, and the detent means of the latching means engages the detent means of the second portion of the carrier to latch the carrier in the stored position and preclude the loss of the load should the member break, to a fourth position whereat the load, for example the preferred spare tire installed on a hub, is unlatched and free to move by the letting out or taking up of the member by the operation of the winch to and from the accessible position.

According to another aspect of the invention there is provided a safety device for a spare tire storage assembly, the assembly including a winch affixed by a mounting bracket adjacent a stored position for the spare tire under a vehicle, the winch by the operation of a separate handle lets out and takes up a length of a cable affixed at one end to the winch and preferably to a reel thereof, which letting out and taking up of the cable moves the spare tire, installed on a hub, from a locked stored position under a vehicle, to an unlocked accessible position below the stored position, the safety device comprising a tire carrier for carrying the spare tire installed on the hub, the carrier including a first portion for insertion within an opening in the hub and abutting the bottom of the hub, and a second shank portion having two ends and being affixed to the first portion proximate one end and having an expanded head proximate the other end, the first portion for supporting the spare tire installed on a hub, and the second shank portion being integral with the first portion and being affixed to the other end of the cable remote the winch proximate the head of the second shank portion, the head of the second shank portion of the carrier including a shoulder adjacent the shank portion, the safety device having a preferably hollow portion for engaging said handle, the preferably hollow portion being affixed with a mounting bracket proximate the winch, the preferably hollow portion having a lever associated therewith, preferably the lever including a cam surface for engaging the handle, the lever being moveably affixed with respect to a mounting bracket, the safety device having a resiliently biased pawl moveably affixed with respect to a mounting bracket, the lever being interconnected with the pawl and the lever being moveable from a first position when the handle does not engage the lever and preferably the cam surface thereof to a second position whereat the handle means engages the lever and moves the lever to the second position, the pawl having at least one finger and preferably two disposed therewith and moveable with the pawl by the lever from a third position whereat the spare tire is in the locked position, and the at least one finger of the pawl engages under the shoulder of the head of the second shank portion of the tire carrier to latch the tire carrier in the stored position and preclude the loss of the tire should the cable break, to a fourth position whereat the spare tire installed on a hub is unlatched and free to move by the letting out or taking up of the cable to and from the accessible position by the operation of the winch.

According to yet another aspect of the invention there is provided a safety device for a winch assembly, preferably for a spare tire storage assembly, the assembly including a winch having a housing and affixed by mounting means near a stored position for a load, for example the preferred spare tire, the winch by the operation of handle means lets out and takes up a length of a member (preferably a cable) affixed at one end to the winch and preferably to a reel thereof, which letting out and taking up of the member moves the load, for example the preferred spare tire, installed on a hub, from a locked stored position, preferably under a vehicle, to an unlocked accessible position remote and preferably below the stored position, the safety device comprising in use a carrier and preferably a tire carrier for carrying the load, for example the preferred spare tire installed on the hub, the carrier including a first portion and a second portion, the first portion for supporting the load, the preferred tire installed on a hub, and the second portion being disposed with the first portion in use and engaged in use with the other end of the member remote the winch, the second portion of the carrier including a detent portion, (preferably a shoulder), the safety device being moveable and preferably rotatable by rotation of said handle means when said winch is rotated and including an actuating member preferably for converting rotary motion to substantially linear motion, the actuating member in one embodiment being disposed within the winch housing and in another embodiment being engageable with said winch preferably proximate one side thereof remote said handle means in use, preferably a disk shaped member, the actuating member having disposed therewith control means, preferably disposed proximate a first side thereof, and preferably at least one spiral path, the control means of the actuating member for engagement in use with operating means of said safety device, the operating means having detent means associated with the control means of said actuating member in use and for controlling the motion of said operating means when the winch is rotated (preferably said operating means being a rod having two ends, the first end for engagement with the control means of said actuating member and preferably with the spiral path thereof, and the second end for operating the safety device and in one embodiment the rod operating lever means associated with the safety device), the operating means (and the preferred rod) being moveably affixed with respect to the assembly, the safety device having preferably resiliently biased latching means moveably affixed with respect to the assembly, the operating means (and in one embodiment the lever means) being interconnected with the latching means and being moveable by the actuating member and the control means thereof, in engagement with said detent means of said operating means, from a first position when the winch is not operated and the load is in the stored position, to a second position when the winch is operated and the load is being moved from the stored position, the latching means having detent means disposed therewith and moveable with the latching means by the operating means (and in one embodiment the lever means) from a third position whereat the load, for example the preferred spare tire, is in the locked position when the winch is not operated, and the detent means of the latching means engages the detent means of the second portion of the carrier to latch the carrier in the stored position and preclude the loss of the load should the member break, to a fourth position whereat the load, for example the preferred spare tire installed on a hub, is unlatched and free to move by the letting out or taking up of the member by the operation of the winch to and from the accessible position.

According to another aspect of the invention there is provided a safety device for a spare tire storage assembly, the assembly including a winch affixed by a mounting bracket adjacent a stored position for the spare tire under a vehicle, the winch by the operation of a separate handle lets out and takes up a length of a cable affixed at one end to the winch and preferably to a reel thereof, which letting out and taking up of the cable moves the spare tire, installed on a hub, from a locked stored position under a vehicle, to an unlocked accessible position below the stored position, the safety device comprising in use a tire carrier for carrying the spare tire installed on the hub, the carrier including a first portion for insertion within an opening in the hub and preferably abutting the bottom of the hub, and a second shank portion having two ends and being engaged with the first portion proximate one end and having an expanded head proximate the other end, the first portion for supporting the spare tire installed on a hub, and the second shank portion being engaged with the first portion and being engaged with the other end of the cable remote the winch proximate the head of the second shank portion, the head of the second shank portion of the carrier including a shoulder adjacent the shank portion, the safety device being moveable and preferably rotatable by rotation of said handle when said winch is rotated and including an actuating member preferably for converting rotary motion to substantially linear motion, the actuating member in one embodiment being disposed within the winch housing and in another embodiment being engageable with said winch preferably proximate one side thereof remote said handle in use, preferably a disk shaped member, the actuating member having disposed therewith at least one preferably spiral link control path having a first and second end, preferably the first end of the link control path being disposed proximate the centre of the actuating member and the second end of the link control path being disposed proximate the perimeter of the actuating member, preferably the link control path being disposed proximate a first side of the actuating member remote said handle in use, the link control path of the actuating member for engagement in use with an operating link of said safety device to move said operating link and operate said safety device, the operating link (preferably said operating link being a rod) having two ends, one end thereof associated with the link control path of said actuating member in use and for controlling the motion of said operating link when the winch is rotated and the second end for operating the safety device (and in one embodiment the rod operating lever means associated with the safety device), the operating link being moveably affixed with respect to the assembly, the safety device having a resiliently biased pawl moveably affixed with respect to a mounting bracket, the operating link being interconnected with the pawl and being moveable from a first position when the handle does not rotate the winch whereat the end of the operating link engaging the link control path of the actuating member is proximate the first end of the link control path, to a second position whereat the handle rotates the winch and the end of the operating link engaging the link control path of the actuating member is proximate the second end of the link control path, the pawl having at least one finger, and preferably two disposed therewith, and moveable with the pawl by the motion of the operating link from a third position whereat the spare tire is in the locked position, and the at least one finger of the pawl engages under the shoulder of the head of the second shank portion of the tire carrier to latch the tire carrier in the stored position and preclude the loss of the tire should the cable break, to a fourth position whereat the spare tire installed on a hub is unlatched and free to move by the letting out or taking up of the cable to and from the accessible position by the operation of the winch.

In a preferred embodiment the detent means and the preferred at least one finger of the latching means and the preferred pawl has disposed therewith cam surfaces to engage the second portion of the carrier when the load is moved from the accessible position to the stored position to ensure proper positioning of the detent or finger of the latch with respect to the detent of the second portion of the carrier when the load is moved to the stored position.

According to yet another aspect of the invention there is provided an actuating member and preferably a disk shaped member, for converting rotary motion to substantially linear motion, preferably in one embodiment being disposed within a winch housing and preferably in another embodiment being engageable with said winch, the actuating member having disposed therewith control means, preferably disposed proximate a first side thereof, and preferably at least one spiral path, the control means of the actuating member for engagement in use with operating means of at least a two operating position device, the operating means having detent means associated with the control means of said actuating member in use and for controlling the motion of said operating means when the actuating member is rotated (preferably said operating means being a rod having two ends, the first end for engagement with the control means of said actuating member and preferably with the spiral path thereof, and the second end for operating the at least two operating position device, and in one embodiment the rod operating lever means associated with the device), the operating means (and the preferred rod) being moveably affixed with respect to the at least two operating position device, the at least two operating position device having actuated means moveably affixed with respect to the assembly, the operating means (and in one embodiment the lever means) being interconnected with the actuated means and being moveable by the actuating member and the control means thereof, in engagement with said detent means of said operating means, from a first position when the actuating means is not operated, to a second position when the actuating means is operated.

According to yet another aspect of the invention there is provided an actuating member for converting rotary motion to substantially linear motion, preferably the actuating member in one embodiment being disposed within a winch housing and in another embodiment being engageable with said winch, the actuating member preferably a disk shaped member having disposed therewith at least one link control path (preferably spiral) having a first and second end, preferably the first end of the link control path being disposed proximate the centre of the actuating member and the second end of the link control path being disposed proximate the perimeter of the actuating member, preferably the link control path being disposed proximate a first side of the actuating member, the link control path of the actuating member for engagement in use with an operating link of said an at least two operating position device to move said operating link and operate said at least two operating position device, the operating link (preferably said operating link being a rod) having two ends, one end thereof associated with the link control path of said actuating member in use and for controlling the motion of said operating link when the actuating member is rotated and the second end for operating the at least two operating position device (and in one embodiment the rod operating lever means associated with the at least two operating position device), the operating link being moveably affixed with respect to the assembly, the at least two operating position device having actuated means moveably affixed with respect to the assembly, the operating link being interconnected with the actuated means and being moveable from a first position whereat the end of the operating link engaging the link control path of the actuating member is proximate the first end of the link control path, to a second position whereat the actuating member rotates and the end of the operating link engaging the link control path of the actuating member is proximate the second end of the link control path, thus moving the at least two operating position device to and from its operating positions.

According to yet another aspect of the invention the aforementioned safety devices and specifically the winch therefore may further comprise an annular raised portion on the housing of the winch for engaging and locking with a supplementary housing containing a torque limiting device operable with said winch.

According to yet another aspect of the invention the aforementioned actuators, safety devices and specifically the winch therefore may further comprise an actuator comprising a disk shaped member of thermoplastic material with an opening provided therewith for the fastening of the actuator in position in use and having substantially arcuate spiral paths provided therewith to control the motion of a rod end, the paths being defined between two substantially spiral shaped raised portions which include a centre broad portion and flexible tapered flange portions proximate the ends of the raised portions, and a raised ring about the perimeter of said member, the raised portions therefore control the rod end therebetween as the actuator is rotated.

BRIEF DESCRIPTION OF THE DRAWINGS

The invention will now be illustrated with respect to the following drawings illustrating embodiments of the invention in which:

FIGS. 7 and 8 are schematic illustrations of improvements of the invention installed and illustrated in two preferred embodiments of the invention.

FIG. 9 is a close-up side plan view of the embodiment illustrated in FIG. 7 and illustrated in a preferred embodiment of the invention.

FIG. 10 is a perspective view of the embodiment illustrated in FIG. 9.

FIGS. 11 is an exploded perspective view of the embodiment illustrated in FIG. 9, and 10.

FIGS. 12 and 13 are schematic views of the latching of the carrier illustrated in a preferred embodiment of the invention.

FIGS. 18 through 20 illustrate schematically the actuator 300 of the previous illustrations and the operation thereof illustrated in a preferred embodiment of the invention.

DETAILED DESCRIPTION OF PREFERRED EMBODIMENTS OF THE INVENTION

Figure 1:
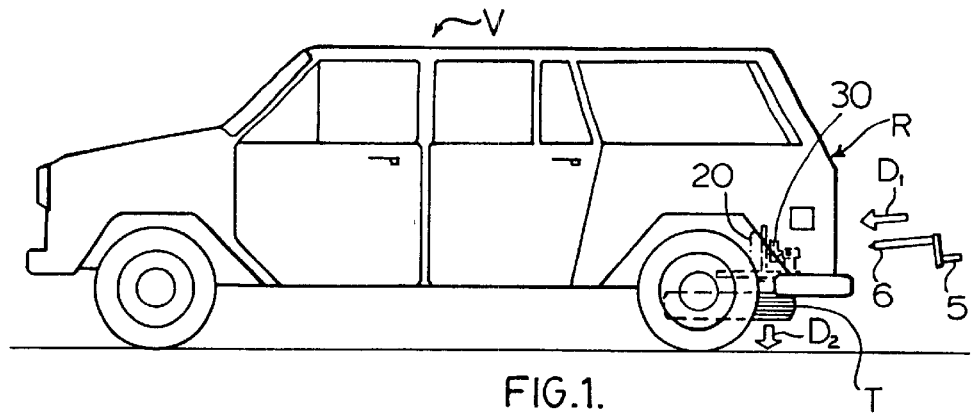
FIG. 1 is a side plan view of a vehicle upon which the invention is installed.

Referring now to FIG. 1 there is illustrated a vehicle V having a winch assembly 20 mounted therewith. Separate from the winch assembly is a torque limiter 30 which may also be integral with the winch. The tire T is conveniently stored under the vehicle V until such time as a user access the tire by lower the tire using the crank handle 5 at the end 6 and inserting it to access the torque limiting device 30 attached to the winch 20. The tire T may then be moved in a direction D2 to lower the tire to the ground. Handle 5 is inserted in a direction D1 in the sleeve 40A wherein a latching mechanism generally referred to as 40 is disposed. The end of the handle 6 engages the cam surface 42a of the lever 40 which is connected to the rod 43 at the end 41. The rod 43 is connected to a latching mechanism 45 at the end 44 thereof. Therefore the latching mechanism 45 rotates in response to the movement of the lever 40 to disengage the shoulder 51 of the head of the shank portion 50 so that the tire carrier portion and the tire may be lowered to the ground.

The assembly includes a mounted plate 29 to which a hollow cylinder 40a is attached, by attaching portions 40b to the bracket 29. When the end 6 of the crank 5 therefore is inserted in the cylinder 40a end 6 abuts the lever cam portion 42a which lever 40 is pivoted at pivot 42, the use of which will be described hereinafter. Therefore the end 6 of the crank 5 is inserted through to the hollow shaft portion 35 which receives the end 6 of the crank handle 5. The torque limiter 30 therefore includes two outer housing portions 35a and 36a. The half 35a includes the hollow shaft portion 35 which half 35a connects to the half 36a which connects to the shaft 36 which continues on to the winch portion 20.

Figure 5:
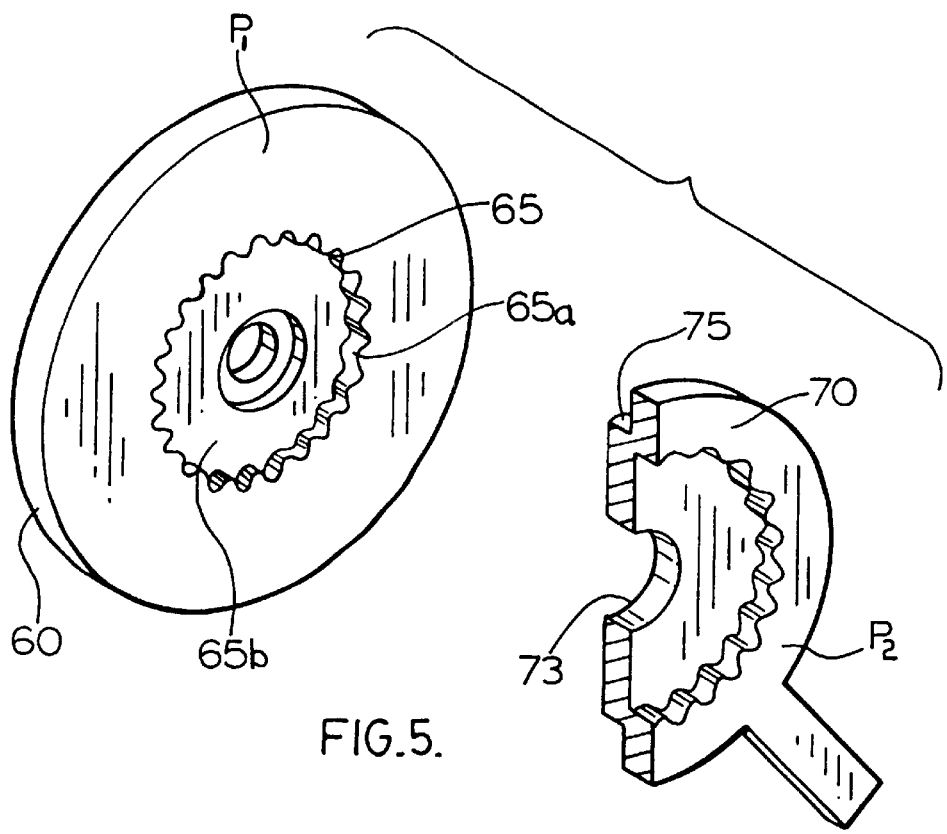
FIGS. 5 and 6 are perspective and side views respectively of the reduction gears of the winch illustrated in a preferred embodiment of the invention.
Figure 6:
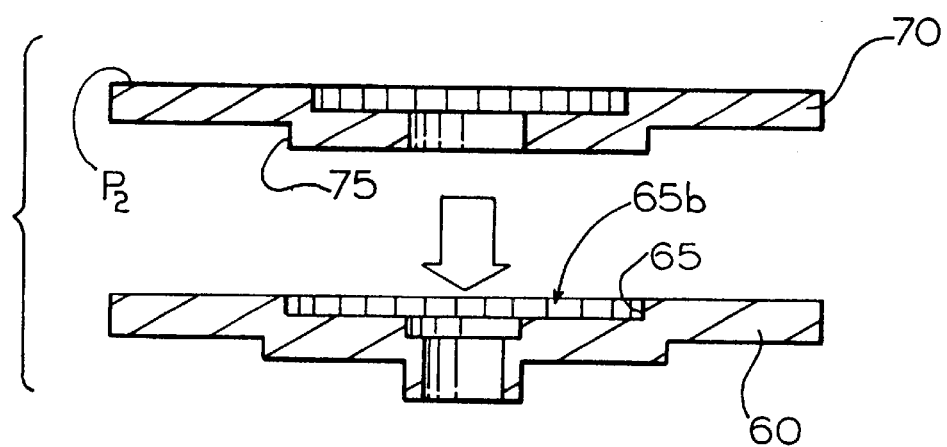

The shaft 36 then continues on to a typical winch including a reel 25. The winch 20 includes a housing 21 mounted to the mounting bracket 15 which winch 20 includes gear reduction portion 70 and 60 as best seen in FIGS. 5 and 6 which are used for speed reduction purposes. The use of these gears will be described hereinafter. A resilient cable 28 is wound on to and off of the reel 25 by the rotation of the crank 5 in the required direction. Any winch structure would suffice and the details of the winch are not provided for this reason. The important portions of the invention are the lever portion 40 and the related latching portion 45 which are actuated by the insertion of the end 6 of the crank arm 5 through the cylinder 40a.

Disposed below the mounting plate 29 is a extension portion 17. The shank portion 50a and the head 50 having shoulders 51 adjacent the shank portion 50a are contained within this frame portion 17 when the tire is retained in its stored position. The latching portion 45 therefore engages the shoulder portions 51 of the tire carrier 50 which retains the the tire in the stored position should the cable 28 break. Further the latch mechanism assists carrying the load of the tire in the normal stored position.

The tire T is attached to a rim T1 at flanges T2 as is typically known in the art. The tire is retained in the stored position by the latch 45 being secured to the shoulder 51 of the head affixed to the shank 50a and having a flange 53 extending underneath the rim T1. This flange 53 raises and lowers the tire T from the stored position to the accessible position as the cable 28 is wound out or wound in. A spring biased device 54 which abuts the flange 54a is provided to retain the correct tension in the unit. This is well known in the art.

When the crank 5 is inserted toward the winch 20 the end 6 of the crank arm passes through the sleeve 40a and abuts the lever 40 at the cam surface 42a thereof to cause such lever 40 to rotate at its pivot 42 and causes the rod 43 attached to the crank or lever 40 at the end 41 to move in a direction compatible to D1 and link with the latch mechanism 45 at point 44. Therefore as the rod 43 moves in the direction D1 it causes the latch mechanism 45 pivoted at 46 via cam portion 47 to pivot in a direction D3 as best seen FIG. 3. Therefore the locking fingers 49 are removed from recess 17A of the frame portion 17 disengaging the finger portions 49 from underneath the shoulder 51 of the head portion 50 of the tire carrier 52.

The rotation of the latch in direction D3 allows the release or latching of the shoulder portion 51 of the tire carrier 52. The tire is shown in the accessible position about to be cranked up to its stored position and latched when handle 5 is removed from the cylindrical portion 40a to release the detent portion 42a and thereby allow the latch portion to return to its locked position under the shoulder 51 of the carrier 52 herein the fingers 49 lock under the shoulder 51 on the butting arcuate surface 44 thereof wherein the tire is therefore in the latched position.

Figure 2:
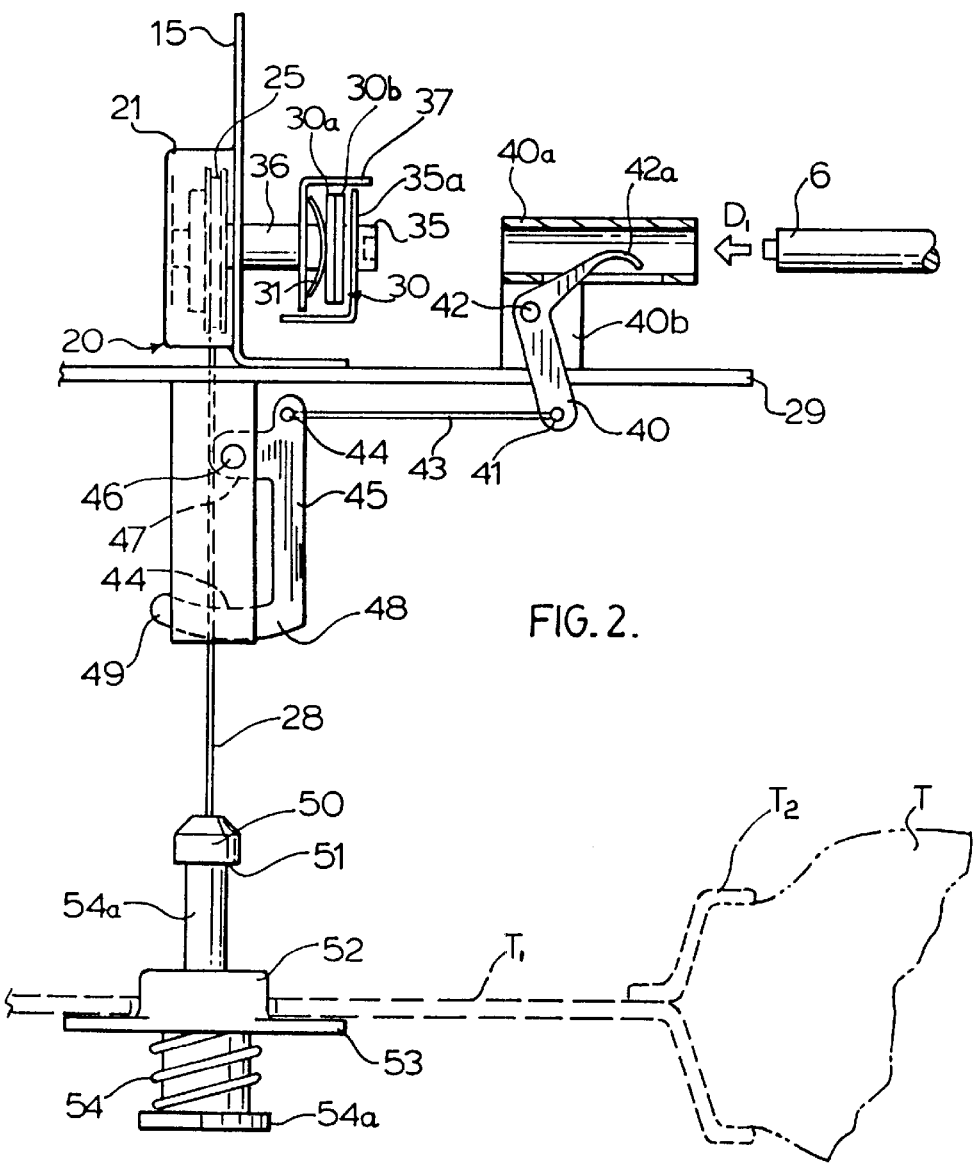
FIG. 2 is a side plan view of the winch assembly of FIG. 1 illustrating the latching mechanism thereof for securing a tire in a stored position under a vehicle and illustrated in a preferred embodiment of the invention.
Figure 3:
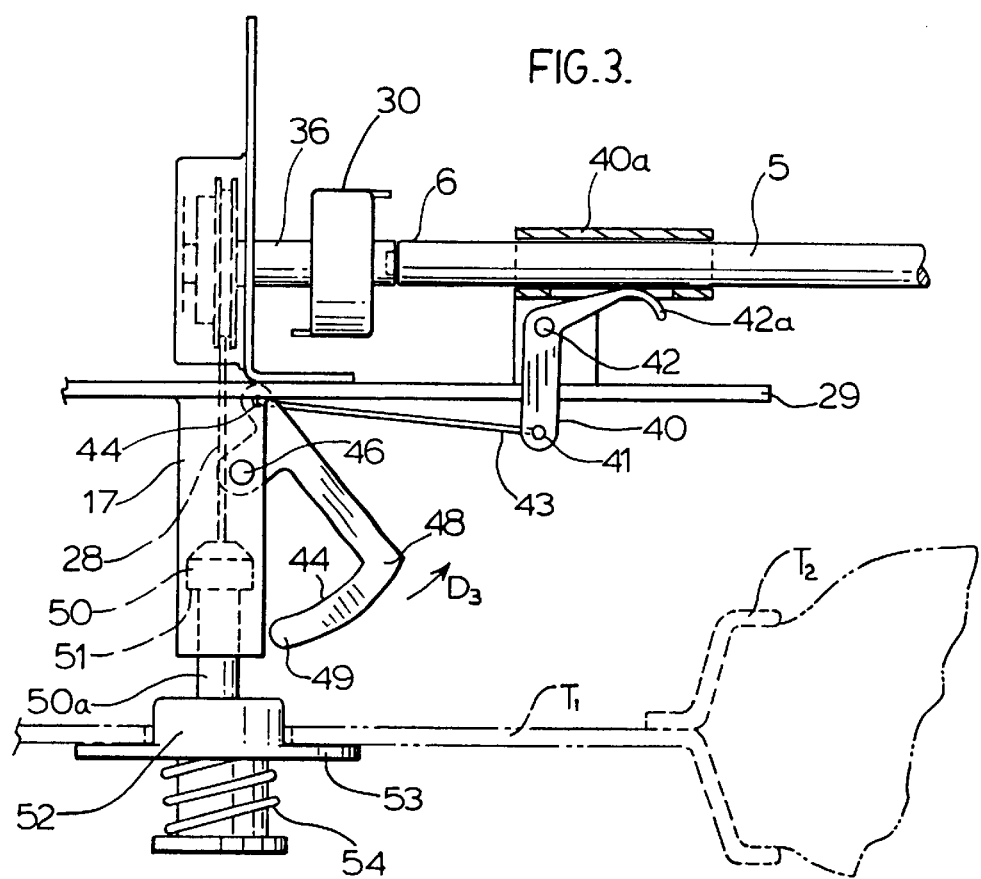
FIG. 3 is a view similar to that of FIG. 2 illustrating the action for unlatching the securing mechanism of the winch assembly when a crank is inserted for operation of the winch illustrated in a preferred embodiment of the invention.
Figure 4:
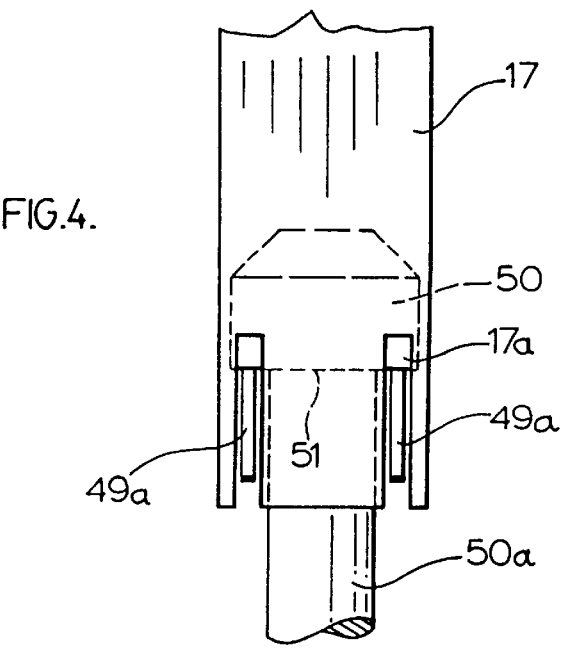
FIG. 4 is a close up view of the latching portion 49 illustrate in perspective and top plan view winch 20 illustrated in a preferred embodiment of the invention.

Referring now to FIGS. 2 and 3 it can be readily seen that the torque limiting device 30 is contained separately from the winch assembly 20. Therefore the torque limiting device 30 includes two halves 36a and 35a which contain the torque limiting plates 30a and 30B which engage at all times and are held in constant engagement by the belleville spring 31. Therefore the spring 31 and the plates 30a and 30b are contained between the two portion 36a and 35a The shaft 35 is affixed for example by welding to portion 35a. The portion 35a and the torque plates 30a and 30b are also pressed against the other halve of the housing 36a. The portions 37 are used for connecting the two plates 35a and 36a loosely together. Therefore when the shaft 5 at end 6 is inserted within the hollow of the shaft 35 and turned the housing portion 36a and the shaft 36 which engages the winch 20 are also rotated. The torque limiting plates 30a and 30b include a multiplicity of teeth, which at a predetermined torque, the plates slip with respect to one another and thus provide overload protection for the winch 20. The torque limiting device 30 is a supplement to any winch and it may provide an add on package for a winch which has no torque overload protection by merely inserting this package 30 on a convenient shaft in between the housing 20 and the handle.

Referring now to FIGS. 5 and 6 there are illustrated ring gear portions 60 stamped from a metal disk wherein the recess 65 including the teeth 65a are produced by stamping the ring gear 60 so as to raise a portion thereof out of the plane of the ring gear 60. Similarly the planetary gear portion 70 includes teeth 75 which are formed by raising the teeth 75 out of the plane P2 of the planetary gear 70. In doing so a pocket is provided behind the section having the teeth 75 thereon. This therefore provides a simple method of forming a ring gear and a planetary gear which is easy to manufacture. The ring and planetary gear inter fit as best shown in FIG. 6 wherein the teeth 75 which extends laterally away from the plain P2 of the ring gear 70 are inserted within the opening 65b of the ring gear 60 so that the teeth 65 of the ring gear engage the teeth 75 of the planetary gear. Within the winch 20 there is an offset which is inserted within the opening 63 of the ring gear 60 so that the planetary gear may wobble about the opening 73 therein and thus provide gear reduction which is known as taumel gear reduction. Therefore within the winch 20 there is provided taumel gear reductions portions including a ring gear 60 and an planetary gear 70 which are manufactured by a stamping process from flat circular plates and have teeth on the ring gear and teeth on the planetary gear which inter engage having been formed by metal stamping techniques. Generally there is one less tooth formed with the planetary gear than the ring gear to effect the taumel principle.

Referring to FIGS. 7 and 8 there is illustrated two embodiments of improvements to the invention. The embodiments illustrate winches 120 and 220, installed adjacent the bottom V1 and V2 of vehicles VA and VB, for moving a tire TA and TB from a stored position to an accessible position. Specifically FIG. 8 illustrates a winch 220 installed at a distance from the tire TB separated therefrom by an cable access tube 228A. Further the winch 220 is disposed horizontally whereas winch 120 is disposed vertically. Handle 206 is provided in FIG. 8 to rotate the winch 220.

Referring now to FIGS. 9, 10 and 11 there is illustrated the winch 120 of FIG. 7, the winch components being contained between the housing 121 and the backing plate 115 similar to the unit described in relation to FIGS. 2 and 3. Nut 135a is provided for access by the handle H at end 106a thereof. The winch 120 is attached to the bottom V1 of vehicle VA at 129 by exemplary mounting holes 115b so that the portions illustrated extend through the bottom 129 toward the tire TA. Alternatively the flange 115a may be welded to the bottom 129 of the vehicle. In this manner the cable 128 may be lowered and raised securely to and from the stored and accessible positions.

The tire carrier 150 is provided at one end of the cable and operates in a similar manner to the assembly of FIGS. 2 and 3 with the exceptions as will be described as follows.

The backing plate 115 is formed from a single stamping which includes mounting portions 115b and 115a and flanges 115c and 115d. The portion 115c has a passage similar to that illustrated in FIG. 2 to provide for the passage of cable 128. The winch 120 and the components thereof are housed within the cover 121 and the backing plate 115. On the other side of the backing plate is provided the actuator 300 fixed in position by hexagonal threaded fastener 300a. As best seen in FIGS. 18 through 20 there is provided on the side of the actuator nearest bracket 115 substantially spiral shaped control paths 301 and 302 within which end 181 of serpentine rod 180 is disposed. When the winch 120 is operated by the handle H, the actuator 300 is also rotated. The handle H2 is operated and is connected by arm H1 to end H3 wherein is disposed at opening 106a to engage end 135a of of spindle 135a. When the winch 120 is operated in a clockwise direction thereby paying out the cable 128, the actuator 300 will rotate in a counter clockwise direction (when viewed in relation to FIG. 10) moving the rod end 181 towards the perimeter of the actuator which causes the lever arm 141a of lever 140 near the other end 182 of rod 180 to move about pivot 140a fixed to flange 115d of bracket 115. The leg 141 of lever 140 is fixed at 143b to rod 143 which in turn engages with openings 148a to locking member 148 which works substantially the same as item 48 of FIG. 2 with the exception that item 148 moves in a more linear fashion than item 48 of FIG. 2. A torsion spring 148b is provided to bias member 148 within windows 115f of flange 115c to the locked position. Therefore when the carrier is in the position shown in FIG. 13 as the winch 120 is rotated the actuator is also rotated to move end 181 of rod 180 in the manner described above so as to remove the forks 149 sufficiently away from the carrier shoulder 151 to allow the cable 128 to be payed out and the tire to be moved to the accessible position. When the winch 120 is rotated back to the stored position, after a tire change and presumably with a repaired tire thereon, the rod end 181 will be moved along paths 301 and 302 towards the centre nut 300a returning the forked portions 149 to the latched position. As the carrier 155 returns to the latched position the head 150 abuts the tapered surface 149a of forks 149 at cam surface 150a thereby forcing the forks 149 away from the head 150 as best seen in FIG. 12 until the forks are free to return under the shoulders 151 of: head 150 as best seen in FIG. 13, being biased to do so by torsion spring 148b.

Figure 14:
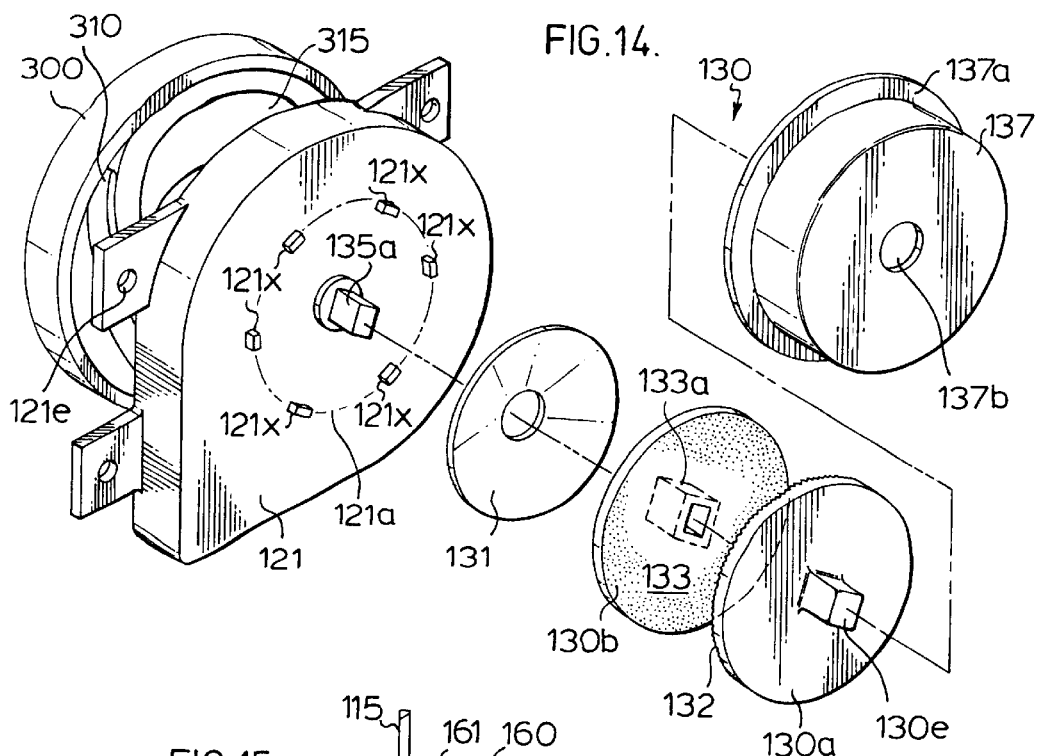
FIG. 14 is an exploded perspective view of an improvement to the torque limiter of the assembly illustrated in a preferred embodiment of the invention.
Figure 15:
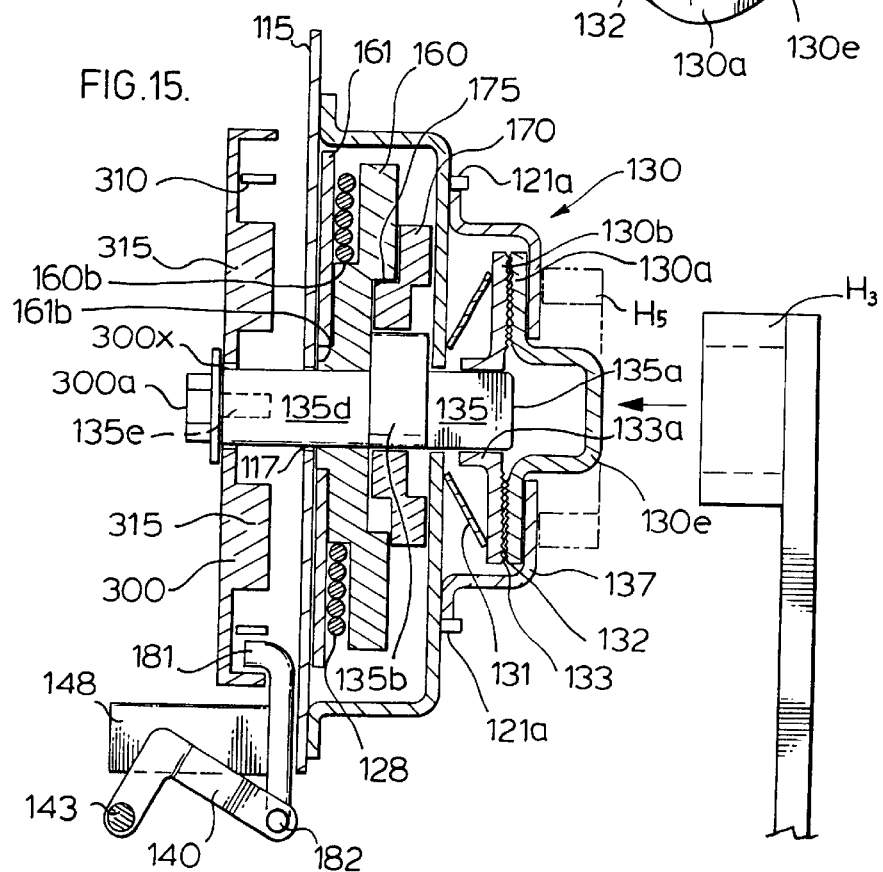
FIG. 15 is a cut-away view of the integrated assembly of the invention of FIG. 14 illustrated in a preferred embodiment of the invention.
Figure 16:
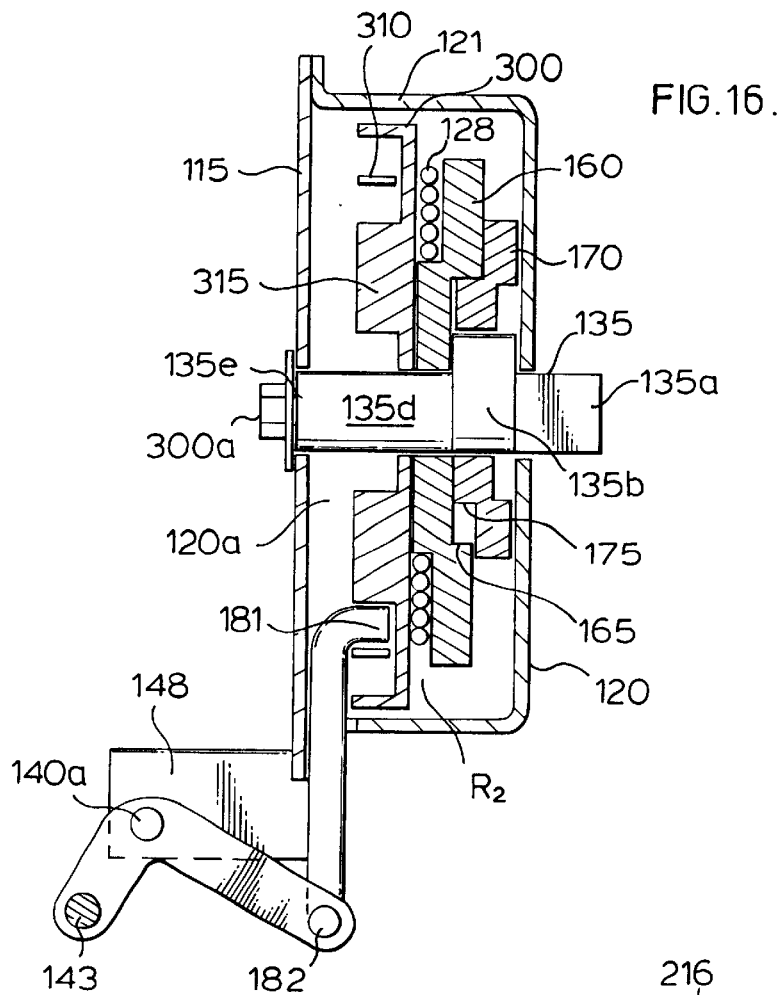
FIG. 16 is a partially cut-away side plan view of a winch including a unique actuator contained within the housing of the winch and illustrated in a preferred embodiment of the invention.
Figure 16A:
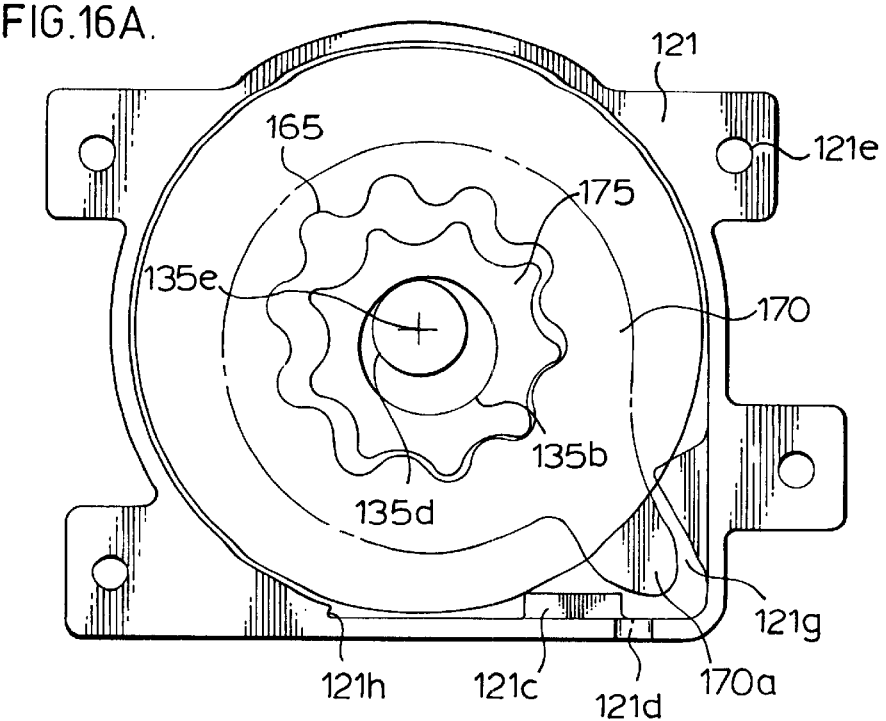
FIGS. 16A and 16B illustrate the operation of the winch of FIG. 16.

As best seen in FIGS. 14, 15 and 16 cable 128 is anchored in slot 160a of circular plate 160 which plate forms one half of the winch reel R defined with the other reelplate 161. As shown the cable will therefore wind on the reel R in a clockwise direction (when observed from the housing end 121 of FIG. 14) in this embodiment only, and accumulates one layer above another on surface 160b when the winch is operated. A housing 121 is provided at one end of the winch components which is mounted via opening 121e (via fasteners not shown) to the bracket 115 also providing the other closing end of the winch 120. A spindle 135 therefore extends through the opening 121b of housing 121 and an opening 117 in the mounting plate 115 as best seen in FIG. 15. A nut end 135a is therefore provided for access by the handle H or for engagement with a separate clip on torque limiter as best seen in FIGS. 14 and 15. The spindle 135 therefore passes through an opening 173 of gearplate 170 which has gears 175 provided therewith, having nine teeth. A tail portion 170a is provided with gearplate 170 to prevent the free rotation thereof in operation as best seen in FIG. 16A. The spindle 135 therefore engages gearplate 170 proximate opening 173 at eccentric portion 135b of spindle 135, the opening 173 being slightly larger than the eccentric portion 135b. The eccentric portion therefore wobbles within the opening 173 or gearplate 170 in use.

As best seen in FIG. 15 the spindle portion 135d therefore passes thereafter through, the opening 160d of reelplate 160, the opening 161b of reelplate 161, the opening 117 of bracket 115, and finally through the opening 300x of the disk shaped actuator 300 whereat a hexagonal threaded fastener 300a engages opening 135e, as best seen in FIG. 15, thereby fastening and retaining all of the winch components.

The reelplate 160 is constructed similarly to the structure illustrated in FIG. 5 and has a ring gear 165 formed on the side thereof nearest the gearplate 170, as best seen in relation to FIG. 16A, which has ten engaging teeth to engage the nine teeth 175 of gearplate 170. This difference of one tooth in the number of teeth between the gears 165 and 175 causes a speed reduction but increased torque in the operation of the winch which speed reduction principle is known and described in many winch assemblies in the prior art. Therefore as the handle H is operated in a clockwise direction (when observed in FIG. 14), the spindle 135 will also rotate in a clockwise direction; the eccentric portion 135b operating within the opening 173 of gearplate 170 with the nine teeth 175 engaging the ring gear teeth 165, numbered ten, of reelplate 160 thereby driving the reel R in a direction so as to takeup cable.

Figure 16B:
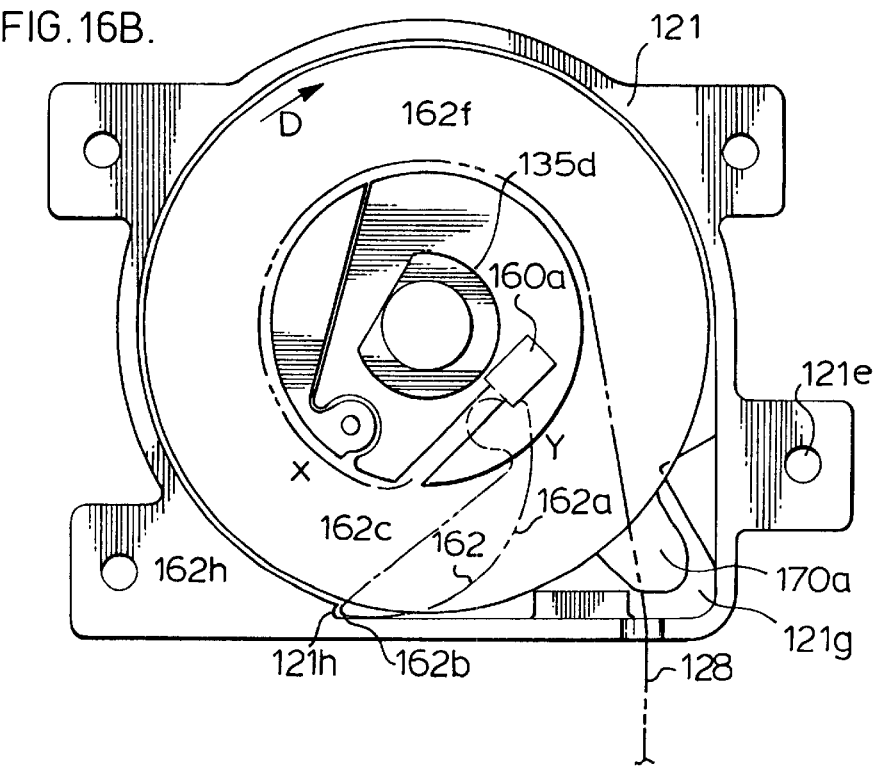

The cable 128 is anchored in opening 160a of reelplate 160 via fastener 128a in a conventional manner. Therefore as the winch is operated the cable will be taken up in the clockwise direction and payed out in the counterclockwise direction. Of course this may be reversed in design. As best seen in relation to FIGS. 11 and 16B there is provided as a part of the bottom 160b of reel R, a resiliently biased arm 162 provided as a anti-backdriving feature for the winch 120. The arm 162 includes an arcuate side 162a which abuts in use the first coil of cable 128 and is retained in position by the first coil at position X, until the cable is payed out to the position Y in FIG. 16B, whereat the arm 162 being resiliently biased outward by torsion spring 162d upon further rotation of the winch engages the detent 121h of the housing 121 at 162b thereby preventing the further rotation of the reel R and the risk of the winch backdriving and taking up cable with the further rotation of the winch 120 thereby damaging the cable. The arm 162 includes a torsion spring 162d having two ends. The first end 162f extends along the arm in a long groove cut in the arm to ensure the proper biasing and motion of the arm, and the second end 162e extend towards the reelplate 160 and is anchored in an opening in reelplate 160 (not shown). A pin extends through opening 162h to anchor the arm 162 to reelplate 161 at opening 161d. Generally an arm such as arm 162 is taught in the art in U.S. Pat. No 2,053,976 issued September of 1936.

Referring now to FIGS. 14 and 15 there is illustrated the same winch structure of FIGS. 9 through 13 with the addition that a torque limiting unit 130 is provided which fastens to the side of housing 121 by annular ring 121a which includes portions 121x which act as clips to fasten over flange 137a of torque limiter housing 137. The housing and the contents thereof when aligned so as to engages the end 135a of spindle 135 as shown therefore clips in position when the flange 137a is pressed over clips 121x causing the clips to flex downwardly until they pass the flange and clip thereover to retain the housing 137 in position. The clips are formed with the annular ring 121a of housing 121 with separations defined between the portions 121x and the ring 121a to allow the independent flexing of the clips.

The torque limiter 130 is similar in design to that illustrated in FIGS. 1 through 6 with the exception that its is joined to the winch housing as a supplementary member utilizing one side of the winch housing 121 to act as a backing plate for housing 137 to retain the torque limiter components. A spring therefore is provided to ensure the engagement of the teeth 132, 133 disposed upon adjacent surfaces of of gears 130a and 130b as best seen in FIG. 15. Member 130a also includes a nut portion 130e for engagement with the handle H in use. Member 130b includes a spindle engaging portion 133a to engage portion 135a of the spindle 135 and hence drive the winch 120 in the manner described previously. Therefore if the handle H accesses the nut 130 formed with the gear 130 via portion H3 thereof, H3 engages the seal H5 of the assembly (which is recommended as a barrier to dirt and moisture but is optional) and nut portion 130e of the torque limiter extending through opening 137b of the housing 137. As the handle H is rotated the nut 130e will cause the gear 130a to rotate which because of the engagement of teeth 132 and 133 will cause the gear 130b to rotate which will in turn cause spindle end 135a to rotate as engaged by portion 133a of gear 130b. The teeth 132 and 133 remain in engagement as biased by belleville spring 131 which under normal operating conditions ensure the engagement of teeth 132 and 133. The torque limiting plates 130a and 130b include the multiplicity of teeth 132 and 133, and at a predetermined torque, the plates slip with respect to one another and thus provide overload protection for the winch 120. The torque limiting device 130 is a supplement to any winch and it may provide an add on package for a winch which has no torque overload protection by merely inserting this package 130 on the winch housing thereof as illustrated in FIG. 15 and described above. The balance of the winch assembly 120 and the operation thereof remains as described above.

Referring now to FIG. 16 there is illustrated a winch assembly as previously described with the exception that the actuator 300 replaces the reel plate 161 in defining reel R2 with reelplate 160. Otherwise the operation thereof is identical to previous descriptions of the assembly. However the embodiment of FIG. 16 presents a more compact package. Further the torque limiting features illustrated and described in relation to FIG. 15 may be incorporated therewith.

Figure 17:
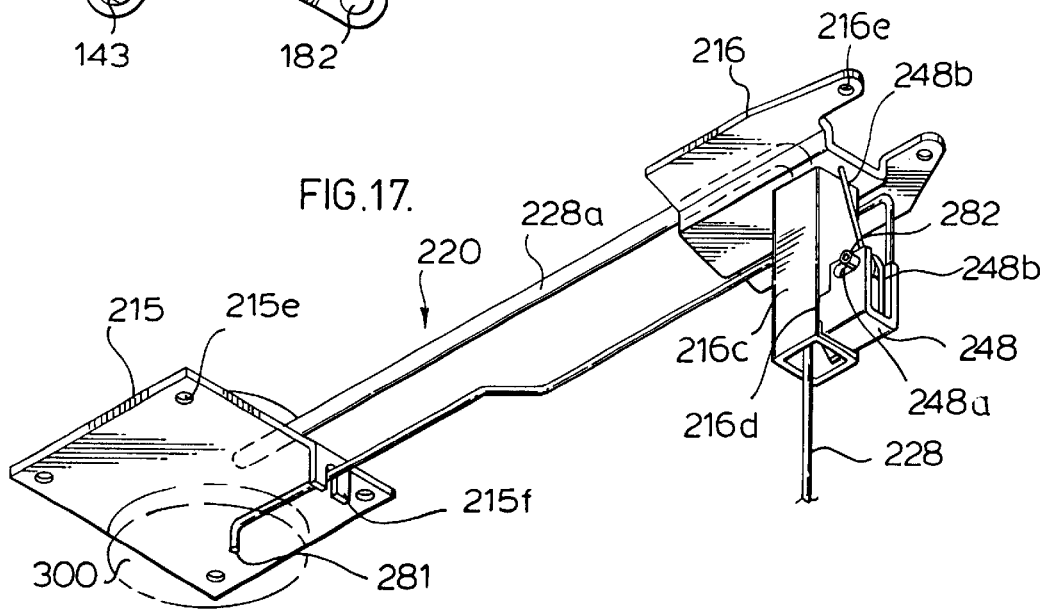
FIG. 17 is a schematic perspective view of the assembly of FIG. 8 illustrated in a preferred embodiment of the invention.

Referring now to FIG. 17 there is illustrated the winch assembly 220 as illustrated in relation to FIG. 8 which separates the components previously described in order to provide a package which may be oriented horizontally. Therefore two mounting plates 215 and 216 are provided. The winch 220 being fastened in use to plate 215 at the bottom of the vehicle and including all of the features previously described including the actuator 300 for engagement with rod end 281 of rod 280. A tube 228a is provided to smoothly carry the cable 228 from the winch 220 to the tire carrier in a manner consistent with the previous descriptions. The rod 280 operates in a manner consistent with the operation of rod 180 described and illustrated above. The latch bracket 216 is mounted under the vehicle via opening 216e, and carries a latch 248 engageable in openings 216d disposed with downwardly extending bracket 216c in a manner as previously described. The rod end 282 rides in slots 248a in latch 248 which as previously described is resiliently biased to the latched position of the carrier by the torsion spring 248b. The rod 280 is guided by portion 215f and an equivalent portion on member 216 (not shown) to ensure rod 280 travels in a substantially linear path to provide linear motion of latch 248 when engaging and disengaging the carrier head 150. Otherwise the operation of the winch 220 and rod 280 in relation to actuator 300 are consistent with the description in relation to FIGS. 9 through 15 above.

Referring now to FIG. 16A there is illustrate the wobbling effect of plate 170 and the gears 175 thereof with respect to the ring gear 165 of reel plate 160 as driven by eccentric 135b of spindle 135. The plate 170 includes a tail portion 170a which is retained in area 121g of the space defined in housing 121 so as to prevent movement of the plate 170 beyond the bounds set by 121g. The motion of the eccentric will cause the gear 175 to drive the reelplate 160 at a speed reduction as is known and described above.

Referring now to FIG. 18 through 20 and FIGS. 14, 15 and 16 there is illustrated the actuator 300 being molded from nylon or plastic with the opening 300x provided therewith for the fastening of the actuator in position as described previously. Substantially arcuate paths 301 and 302 are provided therewith to control the motion of rod end 181 (or 281) when the winch 120 (or 220) is operated. The paths 301 and 302 are defined between two substantially spiral shaped raised portions 305 which include a centre broad portion 315 and flexible flange portions 310 and 320 at the ends of the raised portions 305. Also provide to retain the rod end in use is a raised ring 308. The raised portions 305 therefore control the rod end 181 therebetween as the actuator 300 is rotated. For example when the tire is in the stored position and the latch 148 latches the carrier head 150, it may be desired to to lower the tire for access. The rod end therefore begins at the position as shown in FIG. 18 proximate the centre of the actuator 300. If the actuator were rotated in a direction D1 the rod will remain in its position of FIG. 18 and the flexible flanges 320 will flex outwardly away from the rod end 181 to allow it to pass in one direction only. However when the actuator 300 is rotated in the direction D2 it will be forced to move along the substantially spiral path 301 for one quarter of a turn, not being able to pass the flexible flange ends 320 of the actuator, until the rod end reaches a position near the perimeter of actuator 300. The rod end then travels in paths 303 and 304 bounded by the raised portions 305 and the raised collar 308, passing the flexible flanges 310 in one direction only. The continued rotation of the actuator retains the rod end 181 in the control paths 303 and 304. In moving the rod end 181 from near the centre of the actuator 300 to near the perimeter of the actuator 300, the rod 180 therefore has been moved an equivalent linear amount to the radius of the actuator so as to disengage the latch 148 form the carrier head shoulder 151 as previously described and to allow the lowering of the carrier and the tire to the accessible position. Therefore continued rotation of the winch will not change the position of the rod end 181 until such time as the tire is returned to the stored position and the actuator is rotated in direction D1 whereat the rod end 181 will not be able to pass the flexible flange 310 and will be forced to return along arcuate path 301 or 302 to near the centre of the actuator 300 whereat the rod end 181 will pass the flexible flanges 320 continually until the tire is raised and latched as described previously in relation to FIGS. 12 and 13.

All of the components of the winch assemblies previously described may be manufactured from resilient materials such as nylon or other thermoplastic materials in order to reduce the weight of the assembly. However this is not essential. In doing so weight savings may be realized. Further the embodiments of the invention considerably reduce the number of components of the assembly and hence reduce the weight and increase the reliability thereof. For example a winch assembly of FIG. 8 may be reduced from previously known structures from 43 parts in total to 28 parts, a 34% savings, at a weight reduction from 4.75 pounds to 3.5 pounds, a 26% savings in weight.

As many changes can be made to the invention without departing from the scope of the invention, it is intended that all material contained herein by interpreted as illustrative of the invention and not in a limiting sense.

The embodiments of the invention in which an exclusive property or privilege is claimed are as follows:

1. An improved safety device for use in a winch assembly having a winch reel rotatable upon a drive shaft, said winch reel taking up and letting out a flexible member having a first and second end and being attached to said reel proximate said first end, the improved safety device comprising:
i) a carrier for carrying a load, the carrier including a first portion and a second portion, the first portion having means for supporting the load, and the second portion being engaged with the second end of the flexible member from remote the winch reel, the second portion of the carrier including a detent portion;
ii) a latch actuating member, the latch actuating member being directly mounted on the drive shaft of said winch reel and having an axis of rotation in common with the axis of rotation of said winch reel, the latch actuating member being rotatable simultaneously with the winch reel as said winch reel is rotated, said latch actuating member including control means for controlling the motion of a latch operator when the winch reel is rotated, the latch operator being moveably mounted to the winch assembly;

iii) the control means for said latch operator controlling the motion of the latch operator between a first and a second position;

iv) a latch moveably mounted to said winch assembly and being selectively moveable by said latch operator between a latched position and an unlatched position when the latch operator moves between the first and second positions respectively;

v) the latch having detent means for retaining said carrier proximate a stored position should the flexible member break;

whereby as the drive shaft and the winch reel rotate thereby simultaneously moving the latch operator from the first position when the winch reel and drive shaft are not operated and the load is in the stored position, to the second position when the winch reel and drive shaft are operated and the load is being moved to an accessible position from the stored position as the flexible member is let out, the latch is also moved respectively from the latched position whereat the detent means of the latch is positioned substantially adjacent to the detent portion of the second portion of the carrier to secure the carrier in the stored position should the member break and preclude the loss of the load, to an unlatched position whereat said detent means of the latch is positioned substantially remote the detent portion of the second portion of the carrier, whereat the load is free to move by the letting out or taking up of the flexible member to and from the accessible position.

2. The safety device of claim 1 wherein the latch operator is a rod having two ends, the first end in engagement with the control means and the second end for operating the latch.

3. An improved safety device for a spare tire storage assembly having a winch reel rotatable upon a drive shaft, said winch reel taking up and letting out a cable having a first and second end and being attached to said reel proximate said first end, the improved safety device comprising:

a fire carrier for carrying a spare tire, the carrier including a first portion for insertion within an opening in the tire and a second portion having a first and second end, said second portion being engaged with the first portion proximate the first end thereof and having an expanded head proximate the second end thereof, said expanded head having a shoulder, the first portion supporting the spare tire, and the second portion being engaged with the second end of the cable proximate the expanded head of the second portion;

i) the safety device including a latch actuating member and an operating link engaged with said latch actuating member, said operating link having a first and second end and being moveable between a first and second position, the latch actuating member being directly mounted on the drive shaft of said winch reel and having an axis of rotation in common with the axis of rotation of said winch reel, and including at least one link control track having a first and second end and engaging the first end of said operating link;

ii) the link control track of the latch actuating member engaging the operating link of said safety device proximate the first end thereof and controlling the motion of the operating link between the first and second positions as the first end of said operating link moves between the first and second ends of the at least one link control track of said latch actuating member, and the second end of said operating link operating a latch as said operating link moves between said first and second positions thereof, the latch actuating member being substantially simultaneously operable with the winch reel as said winch reel is rotated by said drive shaft;

iii) said latch being resiliently biased and being moveable by said operating link between a latched position and an unlatched position, the operating link being interconnected with the latch proximate the second end of said operating link and being moveable by the operation of the latch actuating member, iv) the latch having at least one finger integral therewith, wherein when the latch is in the latched position and the spare tire is in a stored position, the at least one finger of the latch is positioned substantially under the shoulder of the expanded head of the second portion of the tire carrier to secure the tire carrier in the stored position and preclude the loss of the tire should the cable break, and when the latch is in the unlatched position the spare tire is unlatched and free to move by the letting out or taking up of the cable to and from an accessible position.

4. The safety device of claim 3 wherein the operating link is a rod having two ends, the first end engaging the link control track of the latch actuating member and the second end operating the latch.

5. The safety device of claim 3 wherein the latch actuating member is substantially disk shaped.

6. The safety device of claim 5 wherein said substantially disk shaped latch actuating member has a center and a perimeter and is formed with an opening for fastening of the latch actuating member in position, said at least one link control track further comprising at least one substantially arcuate spiral track to control the motion of the operating link, the at least one spiral track being defined between at least two substantially spiral shaped raised portions having two ends and including a central broad portion and flexible tapered flange portions proximate the ends of the raised portions, and a raised ring about the perimeter of said substantially disk shaped latch actuating member, the raised portions therefore controlling the operating link therebetween as the latch actuating member is rotated.

7. The safety device of claim 3 wherein the latch actuating member has a center a perimeter, and wherein first end of the link control track is disposed proximate the actuating member and the second end of the link control track is disposed proximate the perimeter of the latch actuating member.

8. The safety device of claim 3 or 4 wherein the link control track is disposed proximate a first side of the actuating member substantially facing said winch reel.

9. The safety device of claim 3 wherein the at least one finger of the latch has cam surfaces to engage under the shoulder of the expanded head of the second portion of the carrier when the load is moved from the accessible position to the stored position.

10. The safety device of claim 1 or 3 wherein the latch actuating member is disposed within a winch housing.

11. The safety device of claim 1 or 3 wherein the latch actuating member is engaged with said drive shaft on one side of the assembly remote from said winch reel.

12. An improved safety device for use in a winch assembly having a winch reel rotatable upon a drive shaft, said winch reel taking up and letting out a flexible member having a first and second end and being attached to said reel proximate said first end, and being attached to a load carrier proximate said second end, said load carrier having a detent provided therewith;

the improved safety device comprising:

i) a latch actuating member operable substantially simultaneously as said winch reel is rotated by said drive shaft, the latch actuating member being directly mounted on the drive shaft of said winch reel, said latch actuating member having an axis of rotation in common with the axis of rotation of said winch reel, the latch actuating member having a motion control for controlling the motion of a latch operator between a first and a second position when the winch reel is rotated, the latch operator being moveably mounted to the winch assembly;

ii) a latch moveably affixed relative to the winch assembly, said latch being selectively moveable by said latch operator between a latched and an unlatched position, the latch operator being interconnected with the latch, the latch having a detent integral therewith;

whereby at the latched position a load is in a stored position and the winch is not operated, and the detent of the latch is positioned substantially adjacent to the detent of the load carrier to secure the carrier in the stored position and preclude the loss of the load should the member break, and at the unlatched position the load is unlatched and free to move by the letting out or taking up of the member to and from an accessible position.

13. An improved safety device for use in a winch assembly, the winch assembly having a winch reel rotatable upon a drive shaft, said winch reel taking up and letting out a flexible member having a first and second end and being attached to said reel proximate said first end, and being attached to a carrier for a load proximate said second end, the improved safety device comprising:

i) a latch actuating member operable substantially simultaneously as said winch reel is rotated by said drive shaft, the latch actuating member being directly mounted on the drive shaft of said winch reel and having an axis of rotation in common with the axis of rotation of said winch reel;

ii) the latch actuating member having a motion control for controlling the motion of a latch operator between a first and a second position as the winch reel is rotated;

iii) a latch being moveably affixed relative to the winch assembly and being selectively moveable by the latch operator between a latched and an unlatched position, the latch operator being interconnected with the latch, the latch having a detent integral therewith;

whereby at the latched position a load is in a stored position and the winch is not operated, and the detent of the latch is positioned to secure the carrier for the load in the stored position and preclude the loss of the load should the member break, and at the unlatched position the load is unlatched and free to move by the letting out or taking up of the member to and from an accessible position.

* * * * *